United States Patent Office 3,450,780
Patented June 17, 1969

3,450,780
DEHYDROHALOGENATION OF
1,2-DICHLOROETHANE
Robert L. Hartnett, Texas City, Tex., assignor to Monsanto Company, St. Louis, Mo., a corporation of Delaware
No Drawing. Filed Mar. 23, 1966, Ser. No. 536,656
Int. Cl. C07c 21/06, 17/24
U.S. Cl. 260—656                                6 Claims

ABSTRACT OF THE DISCLOSURE

A process for producing halogenated unsaturated hydrocarbons such as vinyl chloride by dehydrohalogenation of halogenated saturated hydrocarbons such as dichloroethane at elevated temperatures in contact with a naturally-occurring mineral silicate of the iron garnet group.

---

The present invention relates to the production of halogenated unsaturated hydrocarbons. More particularly, it relates to an improved process for dehydrohalogenating halogenated saturated hydrocarbons to halogenated unsaturated hydrocarbons. Even more specifically, it relates to an improved process for the preparation of vinyl chloride by dehydrochlorination of 1,2-dichloroethane.

It is well known that halogenated saturated hydrocarbons can be pyrolyzed, cracked or thermally dehydrohalogenated to yield halogenated unsaturated hydrocarbons. Dichloroethane, for example, can be thermally converted to vinyl chloride. Certain disadvantages, however, are inherent in such processes as they are conventionally employed. The high temperatures required to obtain satisfactory conversion rates militate against the use of the ordinary materials of construction employed in commercial chemical process operations. At the temperatures employed, too, much of the feed material is degraded to tars and coke which deposit in the apparatus resulting in fouling and clogging of the equipment with consequent shutdowns entailed for cleaning operations. In addition, in the production of vinyl chloride, for example, there is the chloroprene problem. A considerable amount of chloroprene is always formed in the thermal cracking operation and when the unconverted material is recycled, the chloroprene present tends to inhibit cracking or dehydrochlorination. Catalysts have been suggested previously for the dehydrohalogenation process but the advantages they have offered have not been significant enough to engender any confidence or wide acceptance of any catalytic process on a commercial basis.

It is, accordingly, an object of the present invention to provide an improved process for the dehydrohalogenation of halogenated saturated hydrocarbons to halogenated unsaturated hydrocarbons.

It is a further object of the invention to provide a process for the production of halogenated unsaturated hydrocarbons from halogenated saturated hydrocarbons by dehydrohalogenation or cracking which does not require the excessively high temperatures, with their concomitant disadvantages, required in the thermal cracking processes of the prior art.

It is a still further object of the invention to provide a catalytic process for the dehydrochlorination of 1,2-dichloroethane to vinyl chloride which is so efficient and economical as to be well adapted for commercial operations.

These and other objects and advantages of the invention are obtained by dehydrohalogenating or cracking a halogenated saturated hydrocarbon in the presence of naturally-occurring mineral silicates of the iron garnet group as catalysts. Any of the iron garnets such as andradite, almandite and the like can be employed. With these catalysts, dehydrochlorination of 1,2-dichloroethane, for example, can be effected at temperatures from about 500° to about 560° C. to produce vinyl chloride of greater than 99% purity at conversions or once-through yields of 95 to 100%.

The invention is illustrated in the following examples which, however, are not to be construed as limiting it in any manner.

Example 1

A tubular reactor about 6 ft. long and 60 mm. in diameter wrapped with Nichrome wire for heating and covered with asbestos insulation was employed. A thermowell containing thermocouples for measuring temperatures was centrally positioned in the reactor extending throughout its length. Approximately 1500 ml. of a garnet identified and made available commercially as "CSP" grade (80-mesh) Florida garnet by Continental Mineral Processing Co. was charged to the reactor. Based on its chemical analysis, this was a common garnet of the iron group known as andradite. The garnet was fluidized by passing nitrogen up through it while the reactor was heated up to about 380° C. 1,2-dichloroethane was fed to the reactor by sparging nitrogen through a reservoir of the dichloroethane and introducing the admixed vapors into the reactor at a rate of about 12.6 s.c.f.h. (standard cubic feet per hour) where they were contacted with the fluidized garnet. As the feedstream containing about 4 to 5% dichloroethane in nitrogen was introduced, the flow of nitrogen used as the fluidizing medium was proportionately reduced so that the velocity of the entering feed gas stream helped to maintain the garnet in the fluidized state. The temperature was increased step-wise from 400° to 575° C. over a reaction period of about 7.5 hours. Samples of the reactor effluent at various temperature levels were collected and analyzed both by vapor-phase chromatographic means and by titration of the liberated HCl. From the analytical data obtained, conversions of dichloroethane to vinyl chloride or the once-through yields of vinyl chloride obtained were as follows:

| Temperature, ° C.: | Conversion, percent |
|---|---|
| 420 | 10.2 |
| 450 | 32.8 |
| 475 | 54.5 |
| 500 | 74.5 |
| 520 | 86.5 |
| 540 | 96.2 |
| 560 | 96.5 |

No appreciable amount of carbon was formed.

Example 2

The experiment of Example 1 was repeated using "Scotch-Lite" glass beads instead of garnet as the contact material in the reactor. The following conversions were obtained at the specific temperatures.

| Temperature, ° C.: | Conversion, percent |
|---|---|
| 455 | 2.4 |
| 485 | 4.5 |
| 500 | 17.2 |
| 530 | 38.5 |
| 560 | 71.0 |

It is readily apparent from a comparison of the results of Examples 1 and 2 that garnet is an efficient catalyst for the dehydrochlorination of 1,2-dichloroethane to vinyl chloride.

Example 3

Two runs were made using the reactor and essentially the same technique described in Example 1. In these, pure liquid 1,2-dichloroethane was fed through a steam-jacketed vaporizer into the reactor containing 2000 ml. of type "C" (60-mesh) Florida garnet, another variety of the commercially available product generally known as andradite used in Example 1. Feed rates were 4.7 and 10.3 s.c.f.h. and temperature ranged from 350° to 550° C. over the 4.5-hour reaction period. Analysis of the vinyl chloride product indicated it had a purity of 99+%. Conversions or one-through yields are tabulated below.

| Feed rate, 4.7 s.c.f.h. | | Feed rate, 10.3 s.c.f.h. | |
| --- | --- | --- | --- |
| Temperature, ° C. | Conversion, percent | Temperature, ° C. | Conversion, percent |
| 400 | 24.4 | 420 | 15.2 |
| 440 | 47.7 | 450 | 52.3 |
| 470 | 64.4 | 475 | 71.5 |
| 475 | 70.5 | 510 | 96.4 |
| 520 | 89.1 | 540 | 97.0 |
| 540 | 91.5 | | |
| 550 | 98.5 | | |

Example 4

This run was made to determine whether the garnet catalyst of the previous examples could be used to dehydrochlorinate a stream of mixed halogenated saturated hydrocarbons. About 1700 ml. of the "C" garnet of Example 3 was charged to the reactor of Example 1, fluidized and brought up to a reaction temperature of about 500° C. A liquid stream containing 97.1 mole percent of 1,2-dichloroethane, 2.5% trichloroethane, 0.02% 1,1-dichloroethylene, 0.03% trans-dichloroethylene, 0.2% cis-dichloroethylene and 0.02% tetrachloroethane was vaporized and fed to the reactor at a rate of about 8.2 s.c.f.h. over a period of about four hours while the temperature was maintained between about 500° and 540° C. The effluent from the reactor contained approximately 98.6 mole percent vinyl chloride, 0.5% 1,1-dichloroethylene, 0.3% transdichloroethylene, 0.3% cis-dichloroethylene and 0.5% unreacted dichloroethane as determined by vapor-phase chromatographic analysis on an HCl-free basis. Conversion of dichloroethane calculated on the basis of HCl evolved (titration analysis) was 105% indicating that cracking or dehydrochlorination of the trichloroethane in the feedstream took place simultaneously. It is apparent from these results that garnet is as excellent a catalyst for dehydrochlorination of a mixed stream of halogenated saturated hydrocarbons as it is for the pure alkyl halide compound.

The effectiveness of the catalyst of the invention even in the presence of known inhibitors of the dehydrochlorination reaction is illustrated in Example 5.

Example 5

Using the same apparatus and procedure described in the previous examples, a sample of 1,2-dichloroethane containing 2.5% by weight of chloroprene was subjected to dehydrochlorination by bringing it into contact at a feed rate of about 8.2 s.c.f.h. with a fluidized bed of 1700 ml. of "C" garnet maintained at a temperature between about 500° and 550° C. A 95% conversion of 1,2-dichloroethane to vinyl chloride was obtained despite the fact that normally the presence of as little as 500 parts per million (0.05%) of chloroprene in the feed to the cracking or dehydrochlorination reaction completely inhibits this reaction.

Example 6

In this run, the reactor employed was a stainless steel pipe ¾ in x 36 in. packed with about 250 ml. of almandite garnet made commercially available by Barton Mines of New York in the form of chunks approximately ¼ in. x ¼ in. x ½ in. in size. The tube was heated in a tubular furnace so that the temperature of the fixed catalyst bed was maintained in the range from 500° to 600° C. A gas stream resulting from the direct chlorination of ethane with chlorine and containing several chlorinated saturated hydrocarbons was passed through the catalyst bed at a rate of about 17.0 s.c.f.h. The reactor effluent was analyzed by vapor-phase chromatographic means and by titration of the liberated HCl. Analyses of both the feedstream and the product stream tabulated below show that ethyl chloride present therein was converted to ethylene while 1,2-dichloroethane and 1,1-dichloroethane were both dehydrochlorinated to yield vinyl chloride.

| Feedstream | (Percent) | Reactor effluent (percent) Uncorrected for HCl | Corrected for HCl |
| --- | --- | --- | --- |
| Ethyl chloride | 19.6 | 6.2 | 8.6 |
| 1,1-dichloroethane | 3.8 | 0.0 | 0.0 |
| 1,2-dichloroethane | 1.3 | 0.0 | 0.0 |
| Vinyl chloride | 0.5 | 3.7 | 5.2 |
| Ethane | 30.2 | 21.5 | 30.2 |
| Ethylene | 0.0 | 15.0 | 21.0 |

While the foregoing examples illustrate the process of the invention, it is to be understood that various modifications in conditions from those set out therein can be made without departing from the scope of the invention.

The process of the invention can be applied broadly in the dehydrohalogenation of halogenated saturated hydrocarbons containing at least two carbon atoms to the corresponding halogenated unsaturated hydrocarbons. The halogen substituent of the halogenated saturated hydrocarbon charged may be chlorine, bromine or iodine. The process of the invention is particularly advantageous in the treatment of the di-, tri- and tetra-halo-substituted hydrocarbons. Examples of halogenated saturated hydrocarbons which can be dehydrohalogenated using the catalyst of the present invention are ethyl chloride, 1,1-dichloroethane, 1,2-dichloroethane, dibromoethanes, diiodoethanes, trichloroethanes, tetrachloroethanes, triiodoethanes, dichloropropanes, trichloropropanes, dichlorobutanes, trichlorobutanes, dibromobutanes, tribromoethanes, tetrabromoethanes, and higher boiling saturated hydrocarbon chlorides, bromides and iodides. As is evident from the examples, the charge to the system need not be restricted to a single halogenated saturated hydrocarbon but may comprise two or more halogenated saturated hydrocarbons. Gaseous materials inert under the conditions of the reaction such as, for example, nitrogen, may be introduced into the system together with the feedstream or they may be introduced in whole or in part into the reaction zone at a plurality of spaced points along the length thereof.

The particle size of the iron garnet catalyst is not critical. It can be employed in a fixed-bed operation in individual fragments, pieces, lumps or chunks of any practical size. In the preferred embodiment of the invention, however, the catalyst is employed in a fluidized or form commonly known as "garnet sand" having a particle larly critical in this type of operation, iron garnets in the form commonly known as "garnet sand" havng a particle size in the range from 50 to about 250 mesh and preferably from about 70 to about 200 mesh are best suited for maintenance in a fluid or suspended state by the gaseous feed material itself or, optionally, by the use of an inert gas introduced from an outside source.

The reaction can be conducted in a wide variety of reaction vessels and can be a continuous or batch operation. The preferred reactor is a tubular one or a plurality of tubular reactors arranged in series or in parallel with one another provided with means for containing the catalyst and for maintaining the temperatures required for dehydrohalogenation.

The dehydrohalogenation reaction using the catalyst of the invention can be conducted at lower temperatures than those previously required in the art for this reaction at comparable conversion levels. Generally, it can be effected in the temperature range from about 350° to about 600° C. Preferably, for most efficient operation, the reaction is carried out at temperatures from about 520° to about 560° C.

The process is preferably carried out at atmospheric pressure. Either superatmospheric or subatmospheric pressures can be employed, however, although no advantages seem to be gained by their use.

Contact time is not a critical variable and may vary from about 1 to about 30 seconds. Preferably, contact times from about 5 to about 20 seconds are used.

The halogenated unsaturated hydrocarbon product can be recovered readily from the reactor effluent containing it, hydrogen halide and unconverted halogenated saturated hydrocarbon by passing the effluent directly to a condenser, collecting the condensed material for further refinement by distillation or other suitable means, and permitting the hydrogen halide formed in the reaction to pass overhead to a recovery system. Alternatively, the product gases from the reactor can be passed through a recovery system for the hydrogen halide prior to condensing the halogenated unsaturated hydrocarbon and the unreacted halogenated saturated hydrocarbon. Unconverted halogenated saturated hydrocarbon can be recycled, if desired, to the reactor in order to obtain a more complete conversion of feed material to the desired product. Separation of any higher boiling reaction products from the stream prior to recycling is the preferred practice.

Any carbon or carbonaceous products deposited upon the catalyst surface after prolonged periods of operation can be removed by heating the catalyst at elevated temperatures, for example, from about 400° C. to about 600° C. while passing a stream of oxygen-containing gas such as air, flue gas, etc., through it.

Singular advantages of the process particularly for making vinyl chloride from 1,2-dichloroethane using the catalyst of the invention are that known inhibitors of the dehydrochlorination reaction have little or no effect on the degree of dehydrochlorination, impure dichloroethane can be employed as the feed material, no initiator such as chlorine, which is frequently used for this reaction, is required and a substantial reduction in the dehydrochlorination temperature is effected.

What is claimed is:
1. A process for producing vinyl chloride which comprises contacting 1,2-dichloroethane at a temperature of about 350° C. to about 600° C. with a naturally-occurring mineral silicate of the iron garnet group.
2. The process of claim 1 wherein said naturally-occurring mineral silicate of the iron garnet group is andradite.
3. The process of claim 2 wherein said contacting is effected by passing 1,2-dichloroethane through a fluidized bed of said andradite.
4. The process of claim 3 wherein the temperature is maintained in the range from about 520° to about 560° C.
5. The process of claim 4 wherein said 1,2-dichloroethane contains a minor amount of chloroprene.
6. The process of claim 4 wherein said dichloroethane is admixed with hydrocarbons and other chlorinated hydrocarbons.

References Cited
UNITED STATES PATENTS 2,803,680   8/1957   Conrad _____ 260—656

FOREIGN PATENTS 1,212,514   3/1966   Germany.

LEON ZITVER, *Primary Examiner.*

J. BOSKA, *Assistant Examiner.*

U.S. Cl. X.R.
260—654, 677

PO-1050
(5/69)

UNITED STATES PATENT OFFICE
CERTIFICATE OF CORRECTION

Patent No. 3,450,780      Dated June 17, 1969

Inventor(s) Robert L. Hartnett

It is certified that error appears in the above-identified patent and that said Letters Patent are hereby corrected as shown below:

Column 2, line 23, for "1,2-dichloroethane" read ---1,2-Dichloroethane---.

In Column 4, between lines 54 and 55, insert ---pseudo liquid state. While the particle size is not particu- ---.

SIGNED AND
SEALED

NOV 4 1969

(SEAL)
Attest:

Edward M. Fletcher, Jr.
Attesting Officer

WILLIAM E. SCHUYLER, JR.
Commissioner of Patents